June 21, 1960  V. DI CUIA  2,941,463
DOUBLE BROILER

Filed Jan. 12, 1959  2 Sheets-Sheet 1

Inventor:
Victor Di Cuia
By Roy Griffith Jones
Attorney

June 21, 1960 V. DI CUIA 2,941,463
DOUBLE BROILER
Filed Jan. 12, 1959 2 Sheets-Sheet 2

Inventor:
Victor Di Cuia
By Roy Griffith Jones
Attorney

United States Patent Office 2,941,463
Patented June 21, 1960

2,941,463
DOUBLE BROILER

Victor Di Cuia, 84 Howcroft Road, Maywood, N.J.

Filed Jan. 12, 1959, Ser. No. 786,162

1 Claim. (Cl. 99—393)

This invention relates to an electric double broiler.

The invention comprises an upright, oblong enclosure, having top and bottom openings, within which enclosure there is a pair of spaced, upright electric broiling grills. The top opening receives a rack which holds the food to be broiled between the grills. The food is thus broiled on both sides at the same time, thus needing only half the time required when broiling one side at a time. The heat given off by the grills is such that the juices of the meat being broiled therein are simultaneously sealed in on both sides. A small amount of juice will necessarily drip from the meat through the bottom opening of the enclosure, and for this purpose I provide a slidable drip pan under the grills, the pan being withdrawn to pour off the juice. The heat from the grills may be adjusted to provide rare, medium and well done broiling, and a timer may be used to shut off the current at a predetermined time. The current may also be adjusted to provide just enough heat to keep the food warm after broiling. If desired, the spacing of the grills may be adjustable, and, additionally, an automatically rotatable spit may be placed between the grills to hold and rotate the food being broiled. It will be understood that the broiler may also be used as a toaster, and that it may be made in sizes adapted for family and restaurant use, and further, that it may be made inexpensively, due to its simplicity.

Figure 1:
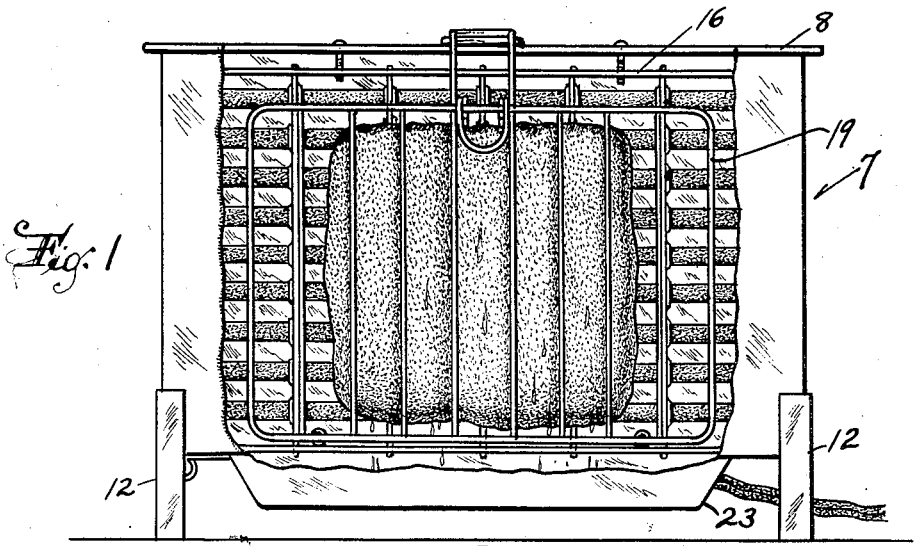
Figure 2:
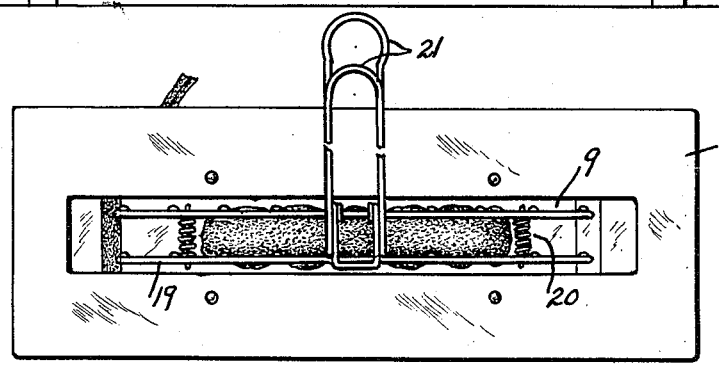
Figure 3:
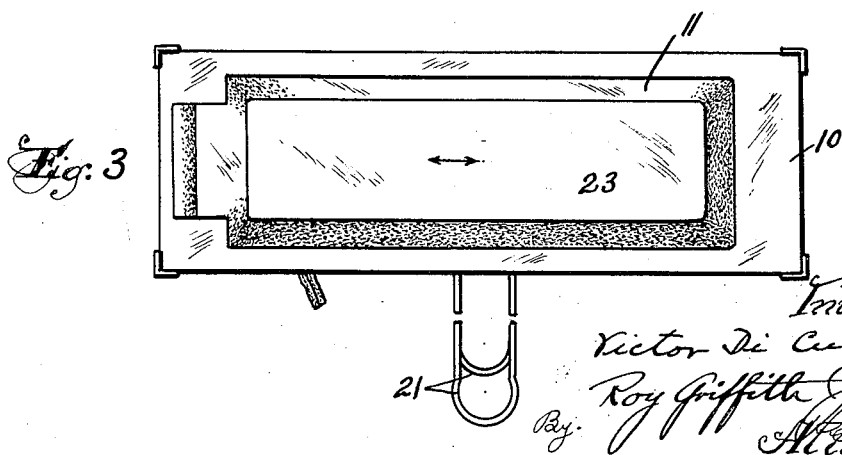
Figure 4:
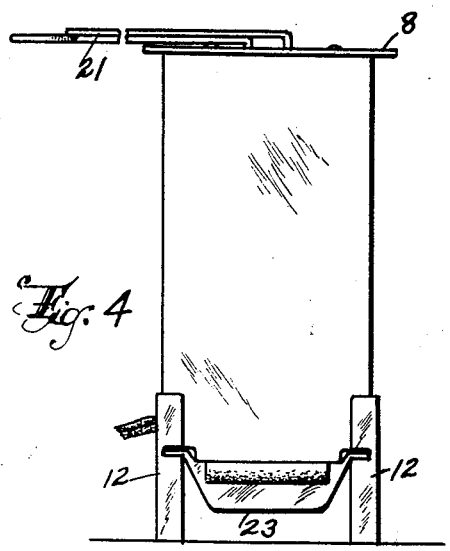
Figure 5:
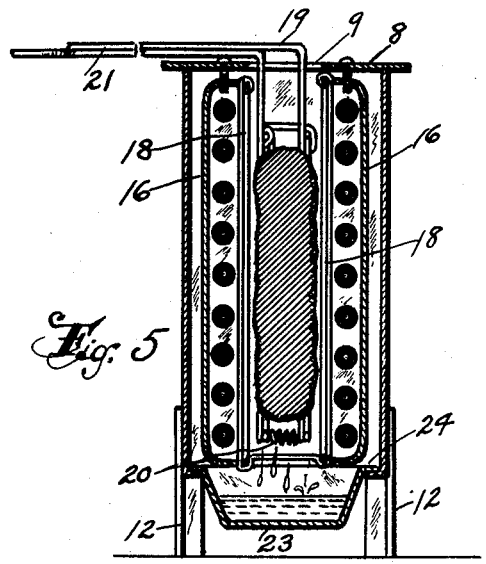
Figure 6:
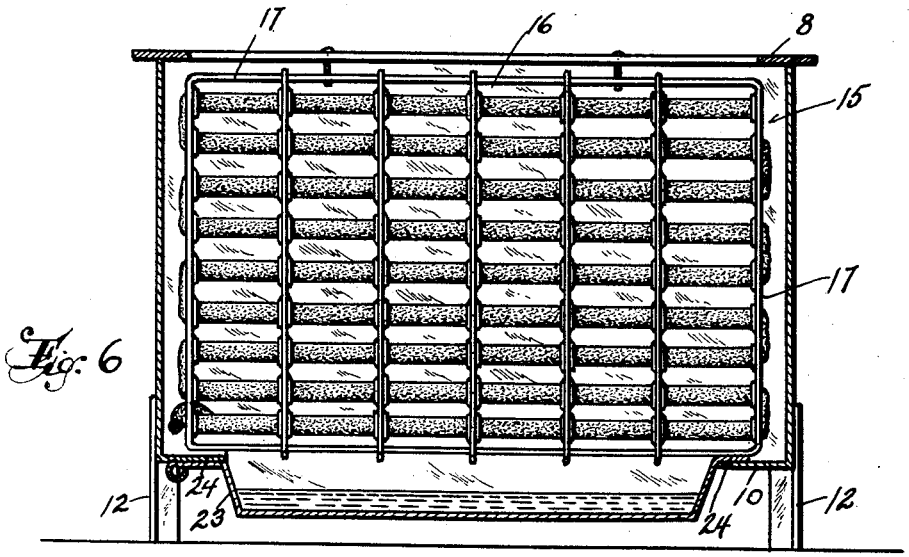

The drawings illustrate one form of the invention, and in these:

Figure 1 is a side elevation, partly in section;
Fig. 2 is a top plan view;
Fig. 3 is a bottom plan view;
Fig. 4 is an end view;
Fig. 5 is a transverse section; and
Fig. 6 is a central, vertical, longitudinal section.

Referring to the drawings for a detailed description, the numeral 7 indicates an upright, oblong enclosure having parallel sides and ends, a flat top 8 with a central oblong opening 9, and a bottom 10 with an opening 11 corresponding to the top opening 9. The enclosure is raised somewhat on legs 12. Within the enclosure are a pair of upright, spaced electric grills or broiling components 15, each supported on a vertical plate 16 having inwardly extending flanges 17 on its sides and ends, said plates spaced from the side walls of the enclosure, as shown in Fig. 5. Vertical, parallel guard wires 18 are attached to the upper and lower flanges of the plates 16 to prevent short circuiting by a metal rack 19 which is put down between the mentioned grills, and which holds the food to be grilled. The rack 19 is shown as an oblong open wire, double structure having a pair of coiled springs 20 (Figs. 2 and 5) at its lower end, which springs function as hinges and stretch to accommodate food of different thicknesses, and contract to hold it in place. While the body of the rack is vertically positioned, the handles 21 are bent at right angles to the body portion. Thereby the handles may rest on the top of the enclosure and extend laterally beyond it, so that the rack is suspended thereby and the hands are not exposed to the heat. As shown in Fig. 5, any juice dripping from the food falls into a drip pan 23, which is slidably held on the bottom of the enclosure, having horizontal side flanges 24 for that purpose, the pan being withdrawable from an end of the enclosure. It will thus be seen that I have provided a double broiler of simple construction which may be economically made, and which has advantages which are readily appreciated, the design being of pleasing appearance and economical of space.

What is claimed is:

A double broiler comprising an upright, horizontally oblong enclosure having horizontally oblong top and bottom openings, a pair of vertical, spaced, electric broiling components within said enclosure, a slidable drip pan below said components, and a double food wire rack vertically suspended between said components, said rack having horizontal handles resting transversely on the top of said enclosure and extending laterally beyond one side thereof, spaced vertical guard wires between the sides of said rack and the broiling components, said double rack comprising a pair of coiled springs connecting the two parts and to function as a resilient, stretchable hinge for the same, and a pair of upright metal plates, one adjacent to but spaced from each side of the enclosure and having inwardly directed flanges over and under the heating components, to which flanges the vertical guard wires are attached, said plates also supporting the electric broiling components.

References Cited in the file of this patent

UNITED STATES PATENTS

| | | |
|---|---|---|
| 1,733,137 | Spang | Oct. 29, 1929 |
| 1,996,297 | Langenfeld | Apr. 2, 1935 |
| 2,025,899 | Rhodes | Dec. 31, 1935 |
| 2,598,592 | Olson et al. | May 27, 1952 |
| 2,787,947 | Schatten et al. | Apr. 9, 1957 |